Aug. 2, 1938.  J. O. COLEMAN  2,125,545
GAUGE
Filed Feb. 14, 1938
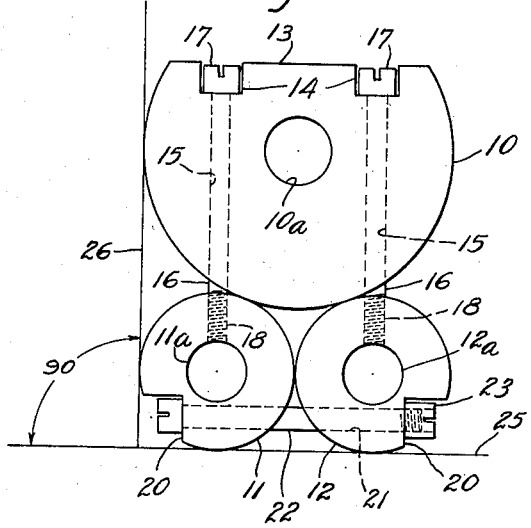
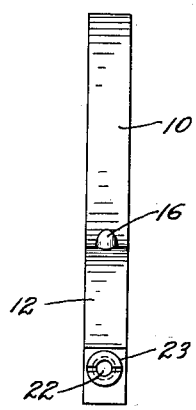
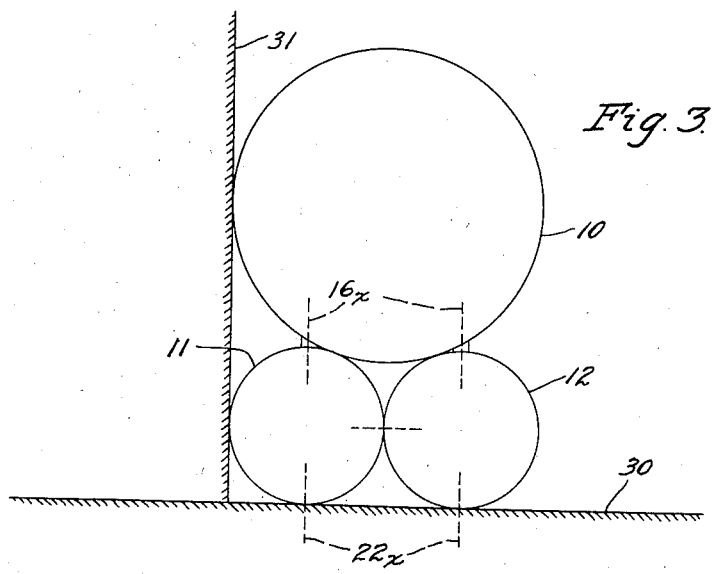
INVENTOR
James O. Coleman
BY
Robt. W. Pearson
ATTORNEY Patented Aug. 2, 1938

2,125,545

UNITED STATES PATENT OFFICE 2,125,545

GAUGE

James O. Coleman, South Gate, Calif., assignor of one-half to Marcus A. Gartner, Los Angeles, Calif.

Application February 14, 1938, Serial No. 190,467

7 Claims. (Cl. 33—174)

This invention relates to a device for precisely indicating a right angle, and to a method for determining a right angle.

An object of the invention is to provide a simple, inexpensive and more dependable means to determine with precision a right angle in order that the two arms of a carpenter's or machinist's square may be angularly gauged at the time it is manufactured; and in order to test, in general, the angle between two planes supposedly in a right-angled relation to each other.

Another object of the invention is to provide a gauge with screw holding means to secure two minor and one major circular members together, to allow the gauge members to be separated and reground, to renew accuracy when damaged.

Other objects, advantages and features of the invention may hereinafter appear.

Referring to the accompanying drawing, which illustrates what is at present deemed to be a preferred embodiment of the invention, Fig. 1 is a side elevation of the device.

Fig. 2 is an elevation thereof looking at either the right or left side of the device as viewed in Fig. 1.

Fig. 3 is a view showing diagrammatically the manner of using the device and also illustrating a method of determining a right angle, which forms a part of the invention.

Referring in detail to the drawing, a major member 10, mainly circular in form, is shown secured to a pair of minor generally circular members 11 and 12, each of said minor members having a diameter which is one-half the diameter of said major circular member. Means are provided whereby all of said members are secured together in peripherally contacting relations to each other.

In the drawing, the major member 10 is shown having a tangential recessed face 13 at one side thereof, there being at the base of said recess two smaller recesses 14. Each of said recesses 14 is the same size as the other, is of a rectangular shape, and is spaced the same distance from the center of the member 10 as is its mate. From the center of the bottom of each of said recesses 14 a bore 15 leads through the member 10 and opens out through its opposite side. These bores 15 are parallel to each other and each receives an attaching member shown as a screw bolt 16 the head 17 of which is in a countersunk relation to the recess line 13 owing to the recess 14 provided for such bolt head. The screw-threaded end portion of each bolt 16 is screwed into a radial bore 18 made in the minor member 12 at that side of the device, it being understood that the structure thus far described is symmetrical, the same parts being duplicated at each side of the structure. By means of said bolts 16 the minor members 12 and 13 are maintained in a peripherally contacting relation to the major member 10 and also in peripheral contact with each other.

As an additional means for maintaining a positive peripheral contact between the two minor members 11 and 12, each of said minor members is right-angularly and peripherally recessed at 20 and is furnished with a bore 21. These bores 21 aline with each other and receive a bolt 22 to tie the minor members 11 and 12 in a positive peripheral contact with each other. One recess 20 receives the head of said bolt and the other recess 20 receives a nut 23 which screws onto said bolt 22.

It is desirable that the members 10, 11, and 12 all be constructed as disks of any thickness, but the claimed invention is not limited to the axial dimensions of these members. The recessed or cut-away part of the major mmber 10, as indicated at 13 in Fig. 1, furnishes a straight edge for the member 10 which is parallel to the straight basal line 25, said line being tangential to both of the minor members. Said line 25 is intersected by a perpendicular line 26. Said lines 25 and 26 may be presumed to represent the inner edges of a carpenter's or machinist's square, the angularity of which is being tested by the device. Owing to the parallelism of said line 13 with the basal line 25 the instrument may be inverted from the position thereof shown in Fig. 1, and thus used to test the angle formed by the lines 25 and 26.

In Fig. 3, the means whereby the major member 10 is secured to the minor members 11 and 12 is diagrammatically indicated at 16x and may consist of dowel pins, or any other suitable securing means, and a corresponding securing means is shown for securing each minor circular member to the flat faced part 30 representing, for example, the bed or face plate of a machine tool. The part 31 represents, for example, the set up of a job the right hand surface of which is intended to be precisely at a right angle to the face of the part 30.

From Fig. 3 it will be seen that the invention, considered as a method, includes the use of three circular members, two of which are of equal diameters, the third member being of a diameter twice as great as that of each of the others; and maintaining all of said members in peripheral contact with each other, thereby indicating a right angle one side of which is formed by a line tangential to the unobstructed sides of the two smaller members, the other side of said right angle being formed by a line which is tangential to one side or the opposite side of the large member and to the smaller member at the same side thereof.

The three circular members are preferably provided with central apertures 10a, 11a and 12a, these apertures being a convenience for mounting said members for precision circular grinding, and the bolts 16 aline with the centers of the openings 11a and 12a of the minor circular members to clear the contacting surfaces between said members, as shown.

I claim:

1. In a device of the kind described, a major circular member, two minor circular members each of which is one-half the diameter of said major circular member, and means whereby all three of said members are secured together in positions wherein each of said members contacts peripherally with the other two.

2. The subject matter of claim 1 and, said securing means being screw-threaded members.

3. In a device of the kind described, a major circular member, two minor circular members each of which is one-half the diameter of said major circular member, said minor members having recesses, and screw bolts whereby all three of said members are secured together in positions wherein each of said members contacts peripherally with the other two, said bolts having their heads within said recesses, said recesses being located where they do not interfere with the device as a whole being used to indicate a right angled relation of two planes to each other when said device is in a contacting relation to both of said planes.

4. In a device of the kind described, a pair of minor circular members each having the same diameter as the other, means whereby said minor members are secured together in a peripherally contacting relation, a major circular member the diameter of which is twice that of each of said minor members, said major member having a tangential recess at one side, and two parallel screw threaded members one at each side of the center of said major member, said screw threaded members occupying bores which extend through said major member at right-angles to said tangential recess, said screw threaded members projecting from said bores into said minor members and securing the latter members to said major member in a peripherally contacting relation to the latter member.

5. In a device of the kind described, a major circular member, two minor circular members each of which is one-half the diameter of said major circular member, and means whereby all three of said members are secured together in positions wherein each of said members contacts peripherally with the other two, each of said members having a central aperture through it.

6. In a device of the kind described, a major circular member, two minor circular members each of which is one-half the diameter of said major circular member, and means whereby all three of said members are secured together in positions wherein each of said members contacts peripherally with the other two, each of said members having a central aperture through it, each of said members being of a disk-like character.

7. In a device of the kind described, a major circular member, two minor circular members each of which is one-half the diameter of said major circular member, and means whereby all three of said members are secured together in positions wherein each of said members contacts peripherally with the other two, each of said members being of a disk-like character.

JAMES O. COLEMAN.